United States Patent [19]

Meixner et al.

[11] Patent Number: 5,756,829
[45] Date of Patent: May 26, 1998

[54] PROCESS FOR THE PREPARATION OF AMINE-MODIFIED EPOXY (METH) ACRYLATES

[75] Inventors: Jürgen Meixner, Krefeld; Wolfgang Fischer, Meerbusch, both of Germany

[73] Assignee: Bayer Aktiengesellschaft, Leverkusen, Germany

[21] Appl. No.: 432,553

[22] Filed: May 1, 1995

[30] Foreign Application Priority Data

May 11, 1994 [DE] Germany .................. 44 16 624.9

[51] Int. Cl.$^6$ ..................................... C07C 67/26
[52] U.S. Cl. ................... 560/209; 525/531; 528/113
[58] Field of Search ........................... 560/196, 209; 525/531; 528/113, 111.5; 522/103

[56] References Cited

U.S. PATENT DOCUMENTS

| | | |
|---|---|---|
| 3,844,916 | 10/1974 | Gaske . |
| 3,914,165 | 10/1975 | Gaske . |
| 3,925,349 | 12/1975 | Gaske . |
| 3,971,834 | 7/1976 | Uzeilmeier et al. . |
| 3,979,270 | 9/1976 | Trecker et al. ................ 204/159.14 |
| 4,081,492 | 3/1978 | Traeckner et al. ............... 260/837 R |
| 4,253,918 | 3/1981 | Traeckner et al. ............... 204/159.22 |
| 4,367,319 | 1/1983 | Pampouchidis et al. ............ 525/504 |
| 4,370,453 | 1/1983 | Omika et al. ..................... 525/450 |
| 5,468,784 | 11/1995 | Yanagawa et al. ................. 522/31 |

FOREIGN PATENT DOCUMENTS

| | | |
|---|---|---|
| 562860 | 9/1993 | European Pat. Off. . |
| 279667 | 6/1990 | Germany . |

OTHER PUBLICATIONS

Database WPI, AN 85-267459 and JP-A-60 181 054 (Nippon Polyurethane) Sep. 14, 1985.
Database WPI, AN 80-83411C and JP-A-55 129 415 (Sumitomo Chemical KK) Oct. 8, 1980.
Database WPI, AN 75-02704W and JP-A-49 095 919 (Asahi Denka Kogyo K.K) Sep. 11, 1974.

*Primary Examiner*—Bernard Dentz
*Assistant Examiner*—Jean F. Vollano
*Attorney, Agent, or Firm*—Joseph C. Gil; Thomas W. Roy

[57] ABSTRACT

The present invention relates to a process for the preparation of amine-modified epoxy (meth)acrylates by reacting organic compounds having epoxy groups with a) acrylic and/or methacrylic acid in a carboxyl/epoxide equivalent ratio of 0.8:1 to 0.99:1 and b) basic nitrogen compounds selected from ammonia and (cyclo)aliphatic primary or secondary amines in an NH/epoxide equivalent ratio of 0.01:1 to 0.2:1, such that the epoxy groups originally present are substantially completely reacted and at least 0.01 NH equivalents, per epoxide equivalent, of the basic nitrogen compounds are reacted with the epoxy groups still present after completion of the reaction according to step a).

A present invention also relates to the use of the amine-modified epoxy (meth)acrylates obtained from this process as binders in radical-cured coating, putty or sealant compositions or for the preparation of molded articles.

8 Claims, No Drawings

PROCESS FOR THE PREPARATION OF AMINE-MODIFIED EPOXY (METH) ACRYLATES

BACKGROUND OF THE INVENTION

1. Field of the Invention

The present invention relates to an improved process for the preparation of amine-modified epoxy (meth)acrylates and their use as radical-cured binders in coating, putty or sealant compositions or for the preparation of molded articles.

2. Description of the Prior Art

Epoxy (meth)acrylates, also known as vinyl ester resins, are prepared by reacting compounds having epoxy groups, particularly the well known epoxy resins, with acrylic acid or methacrylic acid in the presence of a catalyst. Within the context of the invention, "amine-modified epoxy (meth) acrylates" means reaction products obtained by reacting a portion of the epoxy groups with (meth)acrylic acid and a portion of the epoxy groups with ammonia and/or with (cyclo)aliphatic primary or secondary amines.

Such amine-modified epoxy (meth)acrylates are used as binders for molding compositions and coating compositions that can be cured by UV radiation. They are prepared as described, e.g., in DE-OS 2,429,527, by reacting a polyepoxide with more than one epoxy group per molecule initially with 0.01 to 0.5 NH equivalents, per epoxide equivalent, of ammonia or an aliphatic or cycloaliphatic primary or secondary amine, and subsequently with 0.99 to 0.5 carboxyl equivalents, per epoxide equivalent, of acrylic or methacrylic acid.

The amine-modified epoxy (meth)acrylates prepared by this method contain, as a result of non-quantitative reaction, small quantities of unreacted polyepoxide or (meth)acrylic acid. Both are undesirable. DE-OS 2,534,012 proposes a modified process in which the epoxy groups of a polyepoxide are initially reacted with 0.01–0.5 NH equivalents, per epoxide equivalent, of ammonia and/or a primary or secondary amine, subsequently reacted with 0.4–0.9 carboxyl equivalents, per epoxide equivalent, of acrylic or methacrylic acid and subsequently reacted with 0.09 to 0.5 carboxyl equivalents, per epoxide equivalent, of a saturated carboxylic acid. In this process a product is obtained which contains a residual quantity of saturated carboxylic acids in the event of complete epoxide conversion.

The preparation of the above-mentioned binders does, however, involve a difficulty, i.e., the reaction of the polyepoxide with the nitrogen compound containing active hydrogen atoms. Nitrogen compounds containing amino groups not only have the ability to add to epoxy groups, but they can also initiate polymerization of the epoxy groups with themselves by catalytic means. Only at low temperatures and with small quantities of amines is it possible to let the addition reaction proceed preferentially without an undesirable increase in viscosity taking place as a result of polymerization.

Another disadvantage of the last process mentioned is the partial substitution of unsaturated carboxylic acids by saturated carboxylic acids. As a result, the density of double bonds in the epoxy (meth)acrylate is reduced which, in the case of radical cross-linking of the binder, leads to a lower reactivity. Moreover, it is necessary with this process to maintain the reaction temperature for a very long time during preparation in order to obtain the required low epoxy and acid values. This is disadvantageous both for economic reasons and because of a possible deterioration in the product quality.

Accordingly, it is an object of the present invention to provide a process for the rapid preparation of amine-modified epoxy (meth)acrylates in which both the risk of gelation as a result of polymerization of the epoxy groups is reduced and a high double bond density is obtained without residual (meth)acrylic acid remaining in the product.

This object may be achieved by altering the sequence of reaction steps, i.e., during the reaction of compounds having epoxy groups with (meth)acrylic acid and ammonia or primary or secondary amines, at least a portion of the bases are not reacted until the end of the reaction. Preferably, the total quantity of bases is reacted with the epoxides remaining after completion of the reaction with the acids. Surprisingly, in accordance with this process, products are obtained with relatively short preparation times which have a similar viscosity when compared to the products of the prior art, but which do not contain a residual quantity of carboxylic acids or epoxy groups.

These results are particularly surprising since it is known that primary and secondary amines react very rapidly with activated double bonds such as (meth)acryloyl groups (similar to the Michael addition). For this reason it would not be possible to predict that the process according to the invention would result in epoxy (meth)acrylates having viscosities which are similar to the products of the prior art. Presumably, this is also why the prior publications discussed above exclusively teach the reverse sequence of reaction stages.

SUMMARY OF THE INVENTION

The present invention relates to a process for the preparation of amine-modified epoxy (meth)acrylates by reacting organic compounds having epoxy groups with a) acrylic and/or methacrylic acid in a carboxyl/epoxide equivalent ratio of 0.8:1 to 0.99:1 and b) basic nitrogen compounds selected from ammonia and (cyclo)aliphatic primary or secondary amines in an NH/epoxide equivalent ratio of 0.01:1 to 0.2:1.

such that the epoxy groups originally present are substantially completely reacted and at least 0.01 NH equivalents, per epoxide equivalent, of the basic nitrogen compounds are reacted with the epoxy groups still present after completion of the reaction according to step a).

A present invention also relates to the use of the amine-modified epoxy (meth)acrylates obtained from this process as binders in radical-cured coating, putty or sealant compositions or for the preparation of molded articles.

DETAILED DESCRIPTION OF THE INVENTION

Within the context of the present invention, the reaction of the acids is considered to be "completed" such that step b) may be commenced when at least 80, preferably at least 90, equivalent percent of the acid used in step a) has reacted.

Suitable compounds having epoxy groups for use in accordance with the present invention are organic compounds which have a number average molecular weight ($M_n$) of 130 to 1000 and contain per molecule an average of at least one, preferably 1.5 to 6 and more preferably 1.5 to 2 epoxy groups. An "Nepoxide equivalent" means the quantity of an epoxy compound in "parts" which contains one mole of epoxy groups, e.g., a gram equivalent means the weight in grams which contains one gram mole of epoxy groups.

Examples of suitable compounds having epoxy groups are those having an epoxide equivalent weight of 100 to 500, e.g., polyglycidyl ethers of polyhydric phenols such as catechol, resorcinol, hydroquinone, 4,4'-dihydroxydiphenyl-methane, 4,4'-dihydroxydiphenyldimethylmethane (bisphenol A), 4,4'-dihydroxydiphenylcyclohexane, 4,4'-dihydroxydiphenyl-sulphone, tris-(4-hydroxyphenyl) methane and Novolaks (i.e. reaction products of monohydric or polyhydric phenols with aldehydes, particularly formaldehyde, in the presence of acid catalysts).

Also suitable are glycidyl ethers of monoalcohols (such as n-butanol and 2-ethylhexanol), glycidyl ethers of polyhydric alcohols (such as 1,4-butane diol, 1,4-butene diol, 1,6-hexane diol, glycerol, trimethylol propane, pentaerythritol and polyethylene glycols), triglycidylisocyanurate, N,N'-diepoxypropyloxamide, polyglycidylthioethers of polyhydric thiols (such as bismercaptomethyl benzene and diglycidyltrimethylene trisulphone), glycidyl esters of monocarboxylic acids (such as versatic acid) and glycidyl esters of polyvalent, aromatic, aliphatic and cycloaliphatic carboxylic acids (such as phthalic acid diglycidylester, isophthalic acid diglycidyl ester, terephthalic acid diglycidyl ester, tetrahydrophthalic acid diglycidyl ester, adipic acid diglycidyl ester and hexahydrophthalic acid diglycidyl ester).

The reaction of the epoxides with acrylic and/or methacrylic acid takes place according to known methods, for example, according to the processes of DE-OS 2,429,527 or DE-OS 2,534,012, either in the presence or absence of solvents. Suitable solvents include inert solvents such as butyl acetate, toluene, cyclohexane, mixtures of such solvents or the copolymerizable monomers set forth hereinafter.

The reaction of (meth)acrylic acid with compounds having epoxy groups is generally carried out in the presence of about 0.01–3% by wt., based on weight of the starting epoxide, of catalysts such as tert. amines, quaternary ammonium salts, alkali hydroxides, alkali salts of organic carboxylic acids, mercaptans, dialkylsulphides, sulphonium compounds, phosphonium compounds or phosphines. The use of quaternary ammonium salts, such as triethylbenzylammonium chloride, is particularly preferred.

Reaction step a) of the process according to the invention is generally carried out at temperatures of 40° to 90° C., although higher or lower temperatures may be used. The equivalent ratio of carboxyl groups of (meth)acrylic acid to epoxide equivalents is 0.8:1 to 0.99:1, preferably 0.85:1 to 0.98:1. A carboxyl equivalent is the amount of carboxylic acid (expressed in an amount by weight) which contains one mole of carboxyl groups.

The nitrogen-containing bases to be used according to step b) are selected from ammonia and/or preferably (cyclo) aliphatic primary and/or secondary mono- or polyamines having a molecular weight of 31 to 300.

Preferred examples of primary amines include mono- and diamines such as methylamine, n-butylamine, n-hexylamine 2-ethylhexylamine, cyclohexylamine, ethanolamine, benzylamine, ethylene diamine, the isomers of diaminobutane, the isomers of diaminohexane, and 1,4-diaminocyclohexane. Preferred examples of secondary amines include dimethylamine, diethylamine, N-methylethanolamine, diethanolamine, diisopropanolamine and N-cyclohexylisopropylamine.

The nitrogen-containing bases are used in quantities sufficient to provide an equivalent ratio of NH groups to epoxide groups (present at the beginning of the reaction of 0.01:1 to 0.2:1, preferably 0.02:1 to 0.15:1. "NH equivalent" means the quantity of bases (expressed in an amount by weight) which contains one mole of NH groups.

Step b) of the process according to the invention may also take place in the presence or absence of solvents, e.g. those previously disclosed. The reaction temperature is generally also 40° to 90° C., although higher or lower temperatures may be used.

When carrying out the process according to the invention, it is important that at least 0.01, preferably at least 0.02, NH equivalents of the basic nitrogen compounds per epoxide equivalent, preferably the total quantity of the basic nitrogen compounds, be used after the reaction with the acid component according to step a) is "completed." Therefore, it is possible, in principle, to react a portion of the basic nitrogen compounds with the compounds having epoxy groups before the reaction with the unsaturated carboxylic acid, provided that previous condition is satisfied. However, the process according to the invention is preferably carried out such that the reaction according to step a) is completed before the reaction with the basic nitrogen compounds is commenced. As previously stated, step a) is "completed" when at least 80, preferably at least 90, equivalent percent of the acid used in step a) has reacted. This point may be identified from a corresponding fall in the acid value of the reaction mixture.

When carrying out the process according to the invention, care is taken to ensure that, as a result of the partial reactions a) and b), the reaction of all the epoxy groups originally present has essentially been completed. In practice, this means that the sum of the equivalents of the reactants to be used according to step a) and b) is at least 1.0, preferably 1.0 to 1.1 per equivalent of epoxy groups originally present.

In order to protect the polymerizable reaction products obtained according to the invention from unwanted premature polymerization, it is advisable to add 0.001 to 0.2% by wt., based on the weight of the reaction mixture including auxiliaries and additives, of polymerization inhibitors or anti-oxidants during preparation. Suitable stabilizers include phenols and phenol derivatives, preferably sterically hindered phenols.

Other suitable stabilizers are described in "Methoden der organischen Chemie" (Houben-Weyl), 4th edition, volume XIV/1, page 433–452, 756, Georg Thieme Verlag, Stuttgart, 1961. Examples include 2,6-di-tert.-butyl-p-cresol and/or hydroquinone monomethylether or phenothiazine.

The amine-modified products according to the invention may be used without the addition of copolymerizable monomers or solvent. However, since the products are highly viscous in many cases, it is advisable to dilute them with copolymerizable monomers or with inert solvents in order to obtain viscosities suitable for processing and/or to alter the properties of the cured products in a controlled manner. It is not necessary to add monomers or solvents if sufficient quantities of these compounds were used during the production of the amine-modified products.

Suitable copolymerizable monomers include di- and polymethacrylates prepared from glycols having 2 to 6 carbon atoms and from polyols having 3–4 hydroxyl groups and 3 to 6 carbon atoms. Examples include ethylene glycol diacrylate, propane 1,3-diol diacrylate, butane 1,4-diol diacrylate, hexane 1,6-diol diacrylate, trimethylolpropane triacrylate, pentaerythritol tri- and tetraacrylate, and corresponding methacrylates; di(meth)acrylates of polyetherglycols prepared from ethylene glycol, propane 1,3-diol and butane 1,4-diol; triacrylates of the reaction products of 1 mole of trimethylolpropane and 2.5 to 5 moles of ethylene oxide and/or propylene oxide; and tri- and tetraacrylates of the reaction products of 1 mole of pentaerythritol and 3 to 6 moles of ethylene oxide and/or propylene oxide. Other copolymerizable monomers include aromatic vinyl compounds such as styrene; vinylalkyl ethers such as vinylbutyl ether or triethylene glycol divinylether; and allyl compounds such as triallyl isocyanurate.

The copolymerizable monomers are preferably used in quantities of up to 70% by wt., based on the total weight of copolymerizable binder components, regardless of whether they are used as reaction medium when the process is carried out, or subsequently added as an additive.

The previously mentioned solvents or solvents having ketone groups (such as acetone, ethylmethyl ketone or cyclohexanone) may also be used as diluent in quantities of up to 70% by wt., based on the total weight of the composition including additives. These solvents may also be present in these amounts during the reaction according to the invention or afterwards. However, the total quantity of copolymerizable monomers and solvents should not exceed 70% by wt., based on the total weight of the composition.

The products obtained from the process according to the invention or their mixtures with other copolymerizable monomers are valuable compositions that can be cured by means of energy-rich radiation, such as UV light, electron beams or gamma rays. Curing may also take place in the presence of substances yielding radicals, such as (hydro) peroxides, optionally in the presence of accelerators.

The reaction products according to the invention may be used as or for the preparation of coating compositions that can be cured by UV light. A particular advantage resides in the fact that they also cure in very short times in the presence of atmospheric oxygen; however, the addition of photoinitiators is required.

Suitable photoinitiators are known compounds such as those described, e.g., in "Methoden der organischen Chemie" (Houben-Weyl), volume E 20, page 80 Ff, Georg Thieme Verlag, Stuttgart 1987. Examples include benzoin ethers such as benzoin isopropylether, benzil ketals such benzil dimethylketal, hydroxyalkylphenones such as 1-phenyl-2-hydroxy-2-methylpropan-1-one, benzophenone and their derivatives.

Depending upon the appication in which the products according to the invention are used, the photoinitiators are used in quantities of 0.1 to 10 wt. %, preferably 0.1 to 5 wt. %, based on the weight of the reaction products according to the invention and the optionally added copolymerizable monomers. The photoinitiators may be used as individual substance or as mixtures in to obtain advantageous synergistic effects.

The process products according to the invention are preferably used as a binder for coating compositions for coating various substrates such as paper, cardboard packaging, leather, wood, plastics, non-wovens, textiles, ceramic materials, mineral materials, glass, metal, synthetic leather and photographic materials (e.g., paper provided with a photographic layer), and as a binder for moulding compositions. Moreover, the process products according to the invention may be used as a binder for known radical-cured putties or sealants.

The examples below serve to explain the invention in more detail. All the parts and percentages are by weight unless otherwise indicated.

EXAMPLES

The quantity of epoxide set forth in Table 1 was dissolved together with 0.1% of di-tert.-butyl-p-cresol and 0.5% of triethylbenzylammonium chloride in the quantity of copolymerizable monomers set forth in Table 1 and heated to 60° C. with stirring and with the introduction of air.

At this temperature, the quantity of (meth)acrylic acid set forth in Table 1 was added within 1 hour. Stirring was continued at 80° C. until such time as an acid value of less than 3 (mg KOH/g substance) was reached, which corresponds to a conversion of at least 97% of the (meth)acrylic acid used. The quantity of amine set forth in Table 1 was then metered in at 80° C. such that the temperature remained constant. After a post-stirring phase of 3 hours at 80° C., an acid value of less than 1 (mg KOH/g substance) and an epoxide oxygen content of less than 0.3% was found. The mixture was then cooled.

TABLE 1

| Epxoy (meth)acrylate | 1 | 2 | 3 | 4 | 5 | 6 |
|---|---|---|---|---|---|---|
| Starting Material (equiv.) | | | | | | |
| Bisphenol-A-diglycidyl ether (epoxide equivalent: 190) | 1.0 | 1.0 | 1.0 | 1.0 | | 1.0 |
| Hexane 1,6-diol diglycidyl ether (epoxide equivalent: 145) | | | | | 1.0 | |
| Acrylic acid | 0.92 | 0.96 | 0.95 | 0.92 | 0.92 | |
| Methacrylic acid | | | | | | 0.95 |
| Ethanolamine | 0.04 | 0.02 | | | 0.04 | 0.025 |
| Cyclohexylamine | | | 0.025 | | | |
| Hexamethylenediamine | | | | 0.02 | | |
| Diethylamine | | 0.02 | | | | |
| Copolymerizable monomer (% based on total mixture) | | | | | | |
| Hexane 1,6-diol diacrylate | 20 | 20 | 20 | 20 | 20 | |
| Styrene | | | | | | 20 |
| Viscosity (mPa.s/23° C.) | 18200 | 25000 | 24400 | 22900 | 1500 | 2800 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of amine-modified epoxy acrylates which comprises reacting organic compounds having epoxy groups with
   a) acrylic acid in a carboxyl/epoxide equivalent ratio of 0.8:1 to 0.99:1 and
   b) basic nitrogen compounds selected from the group consisting of ammonia and (cyclo)aliphatic primary and/or secondary polyamines and primary monoamines in an NH/epoxide equivalent ratio of 0.01:1 to 0.2:1, such that the epoxy groups originally present are substantially completely reacted and at least 0.01 NH equivalents, per epoxide equivalent, of the basic nitrogen compounds are reacted with the epoxy groups still present after completion of the reaction with component a).

2. The process of claim 1 which comprises reacting the total quantity of the basic nitrogen compounds of component b) after completion of the reaction of the epoxy groups with component a).

3. The process of claim 1 which comprises conducting the reaction in the presence of 0.01 to 0.3% by wt., based on the weight of compounds having epoxy groups, of quaternary ammonium salts as catalysts.

4. The process of claim 2 which comprises conducting the reaction in the presence of 0.01 to 0.3% by wt., based on the weight of compounds having epoxy groups, of quaternary ammonium salts as catalysts.

5. A process for the preparation of amine-modified epoxy (meth)acrylates which comprises reacting organic compounds having epoxy groups with
   a) acrylic and/or methacrylic acid in a carboxyl/epoxide equivalent ratio of 0.8:1 to 0.99:1 and
   b) basic nitrogen compounds selected from the group consisting of
      i) ammonia and (cyclo)aliphatic primary monoamines in an NH/epoxide equivalent ratio of 0.01:1 to 0.2:1 and
      ii) secondary monoamines in an NH/epoxide equivalent ratio of 0.01:1 to 0.15:1, such that the epoxy groups originally present are substantially completely reacted and at least 0.01 NH equivalents, per epoxide equivalent, of the basic nitrogen compounds are reacted with the epoxy groups still present after completion of the reaction with component a).

6. The process of claim 5 which comprises reacting the total quantity of the basic nitrogen compounds of component b) after completion of the reaction of the epoxy groups with component a).

7. The process of claim 5 which comprises conducting the reaction in the presence of 0.01 to 0.3% by wt., based on the weight of compounds having epoxy groups, of quaternary ammonium salts as catalysts.

8. The process of claim 6 which comprises conducting the reaction in the presence of 0.01 to 0.3% by wt., based on the weight of compounds having epoxy groups, of quaternary ammonium salts as catalysts.

* * * * *